Dec. 26, 1961 H. REDLICH ET AL 3,014,992

DUAL SOUND TRACK TRANSDUCER HEAD

Filed Feb. 11, 1957 3 Sheets-Sheet 1

INVENTORS
HORST REDLICH,
HORST ANGENENDT &
GEORG NEUMANN

BY [signature]
PATENT AGENT

INVENTORS
HORST REDLICH,
HORST ANGENENDT &
GEORG NEUMANN

BY [signature]
PATENT AGENT

Dec. 26, 1961 H. REDLICH ET AL 3,014,992

DUAL SOUND TRACK TRANSDUCER HEAD

Filed Feb. 11, 1957 3 Sheets-Sheet 3

INVENTORS
Horst Redlich
Horst Angenendt &
Georg Neumann
BY George H. Spencer
ATTORNEY United States Patent Office 3,014,992
Patented Dec. 26, 1961

3,014,992

DUAL SOUND TRACK TRANSDUCER HEAD

Horst Redlich and Horst Angenendt, Berlin-Steglitz, and Georg Neumann, Heilbronn (Neckar), Germany, assignors to Telefunken G.m.b.H., Berlin, Germany Filed Feb. 11, 1957, Ser. No. 639,429
Claims priority, application Germany Mar. 16, 1956
13 Claims. (Cl. 179—100.41)

The present invention relates to a mechanical-electrical transducer head for producing or following a groove-type sound track in which simultaneously two signals are recorded, preferably different from one another, and having oscillation directions perpendicular with respect to one another. For example, one signal may be recorded on a lateral track, while the other signal is recorded on a depth-cut track. In the literature, the lateral track is frequently called Berliner track and the depth-cut track is referred to as an Edison track. Such mechanical-electrical transducers may be used for purposes of stereophonic sound recording and/or reproducing.

German Patent No. 816,311 discloses a mechanical-electrical transducer for record disk reproducing, wherein separate reproduction of two signals recorded in the manner described on a single groove-shaped sound track is disclosed. This known sound pick-up is provided with a single needle common to both signals, whereby this needle is oscillated according to both signals. For separate pick-up of the two recordings, the pick-up has two circuits co-operating with a common armature, whereby the two signals may be decoupled with respect to each other. Tests with mechanical-electrical transducers, according to the mentioned German patent, on two sound tracks recorded in one groove have shown that it is extremely difficult to obtain sufficient cross-talk isolation from one channel to the other in this system, wherein, in addition to the common needle, a common oscillating armature of a magnet system is provided as the additional mechanical member. This difficulty is partially due to the fact that the armature cannot be designed to be sufficiently stable with regard to oscillations within the whole frequency range, said armature being T-shaped for the double purpose. Furthermore, the mass of the armature cannot be made sufficiently small to obtain a reproduction of the wide frequency band reaching up to the highest sounds where the loading is to be made as small as possible for use as a sound pick-up. Another cause of the cross-talk between the two channels lies in the fact that the adjustment to a position of decoupled symmetry is upset or deflected during practical use since the forces acting on the needle and on the bearings undergo an initial deviation to an extent not easily predictable, whereby a considerable variation of coupling between the two channels results. It was observed that such systems, when adjusted out of contact with the recording to provide a sufficiently large cross-talk isolation, exhibit an unsatisfactorily high cross-talk when they operate under normal mechanical and electrical loads.

British Patent No. 394,325 (see particularly FIGURE 8, and the parts of the specification relating thereto) discloses a sound pick-up with a common pick-up needle for the two signals and mechanical separation of the co-ordinates.

It is an object of the present invention to provide a mechanical-electrical transducer for a sound track having two signals, whereby the mentioned disadvantages of the known transducers are avoided and an undistorted reproduction of a frequency band reaching up to the highest audible sounds is made possible while, at the same time, a large cross-talk isolation is realized. In order to have the oscillating masses as small as possible, the principle of electrical separation of the two signal channels, in case of a common needle and a common movable system, is applied to the transducer designed in accordance with this invention. At the same time, use is made of the fact that, in order to avoid excessive cross-talk under all practical operating conditions, there must be assured over the whole operating frequency range a mechanical connection sufficient to transfer all oscillations with true fidelity between the cutting stylus or pick-up needle and the two members of the oscillating system carrying out the mechanical-electrical translation. This condition is fulfilled and distortion kept at a minimum in the transducer according to the invention, by using an electro-dynamic system operating with coils moving in a magnetic field.

It is another object of the invention to provide a system movable in the two oscillating directions, a cutting stylus or pick-up needle, and a coil body carrying two coils or being formed by these coils, and to arrange these coils freely displaceable in an annular gap crossed by a magnetic field, whereby the turns of the first coils are wound in the same direction around the whole circumference of the coil body or the annular gap and are intended for translation from or into displacement components in the direction of the axis of the annular gap. In the second coil, half of the turns are passed in one winding direction around one section of the coil circumference and in the opposite winding direction over the other section of this circumference, and the connecting portions of the turns in each section are disposed outside the annular gap and, therefore, outside of the magnetic field. In this system, the two coil sections formed by the opposed portions of the coil each overlie only a part of the circumference, preferably each overlies about one-half of this circumference. The second coil formed by these sections is used for conversion from or into displacement components perpendicular to the axis of the annular gap.

It is a further object of the present invention to connect the coil sections of the second coil in series with respect to one another. There are several possibilities for the arrangement of the connecting wires of the coil sections of the second coil.

It is a still further object of the present invention to provide these connecting wires on the side of the coil sections in a space outside said gap and free of the magnetic field to the greatest possible extent.

It is an additional object of the present invention to pass the connecting wires through a slot across the magnet core and out of the magnetic field.

It is another object of the invention to provide the second coil with two oppositely wound sections which are wound separately, or to make the coil sections in the form of a figure-eight.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 3:
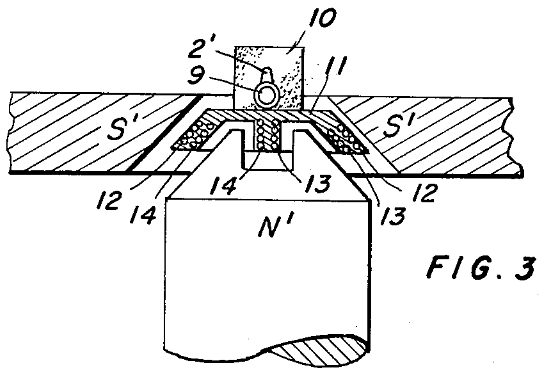
FIGURE 3 shows schematically a section of a modified transducer system according to the invention for reproducing from a sound track.
Figure 4:
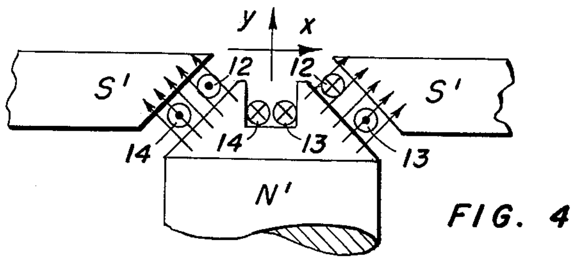
Figure 4A:
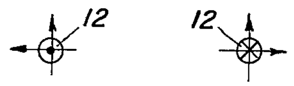
Figure 4B:
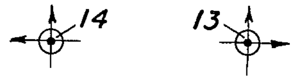

FIGURES 4, *4a* and *4b* illustrate schematically the operation of the system according to FIGURE 3, and more specifically show the position of the magnetic flux lines and the arrangement of the coil portions.

Figure 5:
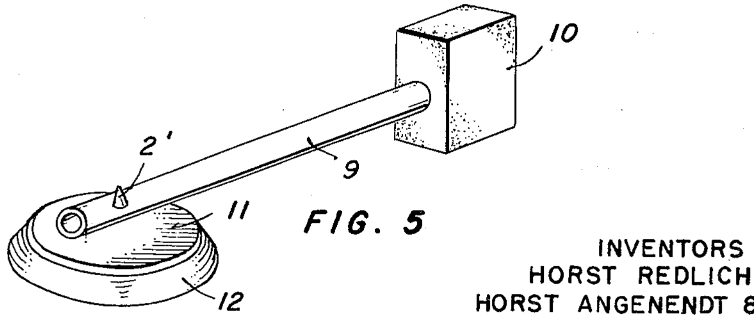

FIGURE 5 is a perspective view of the coil body showing its suspension means in case of a system according to FIGURE 3.

Figure 6:
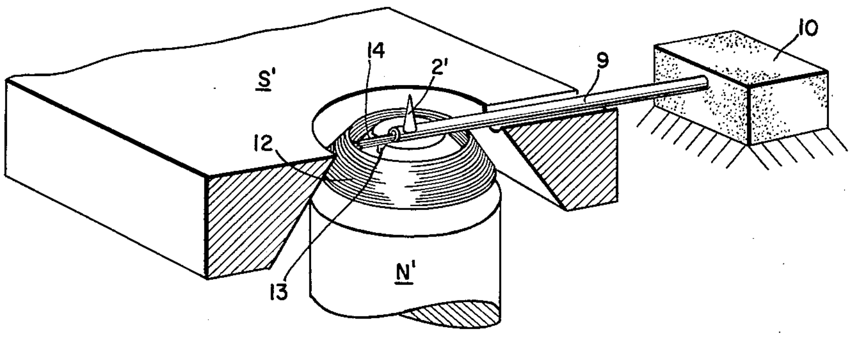

FIGURE 6 is a perspective view showing the arrangement of the coils, the magnet core, the magnetic ring, and the movable arm.

Figure 7:
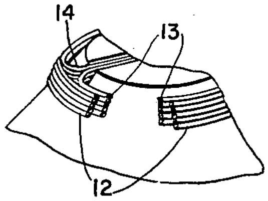

FIGURE 7 is a perspective view, on an enlarged scale, showing the windings of the coils.

Figure 1:
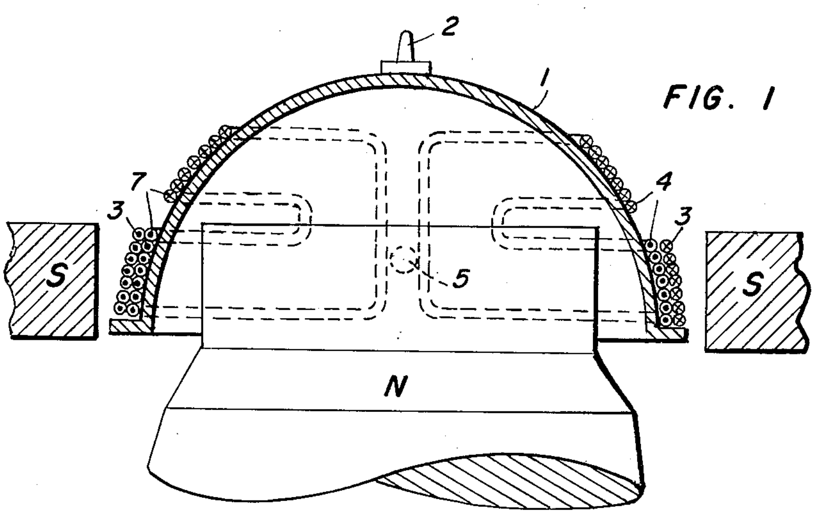
FIGURE 1 shows schematically a section through a transducer head according to the invention for producing a sound track.

Referring more particularly to the drawings, FIGURE 1 denotes a substantially semi-spherical coil body 1 resiliently suspended in elastic bearings by means of a shaft 5. The coil body 1 should be made of a material of high elasticity and low specific gravity in order to obtain as high a sound velocity in this body as possible. A cutting stylus 2 is mounted on the coil body 1. The coil body may be made in the shape of one-half of an ellipsoid if it is desired to increase the distance of the shaft 5 from the cutting stylus 2 in order to obtain a larger linkage amplification with respect to the deflections of the cutting stylus. The coil body 1 carries close to its equatorial plane the coils for the deflection of the body 1. The coil 3 of these coils comprises single turns which are wound around the body near its periphery, wherein all turns have the same winding direction. The direction of passage of the instantaneous current in a coil is indicated in a known manner by a point or a cross on the cross sectional surface of each individual turn. In this disclosure, the individual turns of the coil 3 are indicated on the left side of the drawing by a point within the cross-sectional surfaces in such a manner that the instantaneous current goes into the plane of the drawing away from the viewer, while on the right side of the drawing, the crosses within the cross-sectional ends of the turns indicate in this coil the instantaneous current is directed from the plane of the drawing towards the viewer. In the same manner, the winding direction is indicated in the other coils shown in the drawing. The body 1 supports also the two coil sections 4 and 7 which, together, form the aforementioned second coil of the system. It can be seen that the turns of the coil sections 4 and 7 which are close to the coil 3 are wound in opposite directions with respect to the axis of the coil body. These coil sections 4 and 7 each extend only over half of the circumference of the coil body 1. In FIGURE 1, the free ends of each of the coil sections are joined by connecting wires indicated by dash-dash lines. These connecting wires lie on the coil body and pass over portions of the coils 3, 4, or 3, 7, which are close to one another. The active coil turns are located in the annular gap of a magnet system having a core N, as shown in the drawing, this core forming a magnetic northpole and the outer annular part S forming a magnetic southpole. The planes occupied by the active turns of the coils are parallel with respect to the equatorial plane of the coil body 1. The cutting stylus 2 is close to the point of intersection of the axis of the annular gap with the spherical or ellipsoidal surface of the coil body. The shaft 5 intersects the axis of the annular gap at right angles and is perpendicular with respect to the plane of symmetry of the said second coil formed by the coil sections 4 and 7, said plane of symmetry intersecting or coinciding with the axis of the annular gap. This plane of symmetry is the plane of the drawing in FIGURE 1. The shaft 5 is closer to the active turns of the two coils than the cutting stylus. This shaft 5, as shown in FIGURE 1, is located approximately in the center of the ring determined by the active turns of the coils. The annular gap is bordered by cylindrical surfaces.

If, according to FIGURE 1, an amplified signal current is fed to the coil 3, the instantaneous current flows in all of its turns in the same direction around the magnet core N. Thus, a force P will act upon all of the circumferential portions of the turns under the influence of the magnetic flux between the poles S and N, said force P having in all circumferential portions the same direction, namely, parallel with respect to the axis of the annular gap. Consequently, a displacement of the coil body 1 connected to the cutting stylus 2 in the direction of the axis of the annular gap corresponds to such energization of the coil 3. Suppose the matrix to be cut is located above the stylus 2 in a plane perpendicular with respect to the axis of the annular gap, the signal is recorded on a depth-cut track by means of the displacement of the coil 3, it being required that the shaft 5 be sufficiently resiliently mounted in this direction of displacement.

Figure 2:
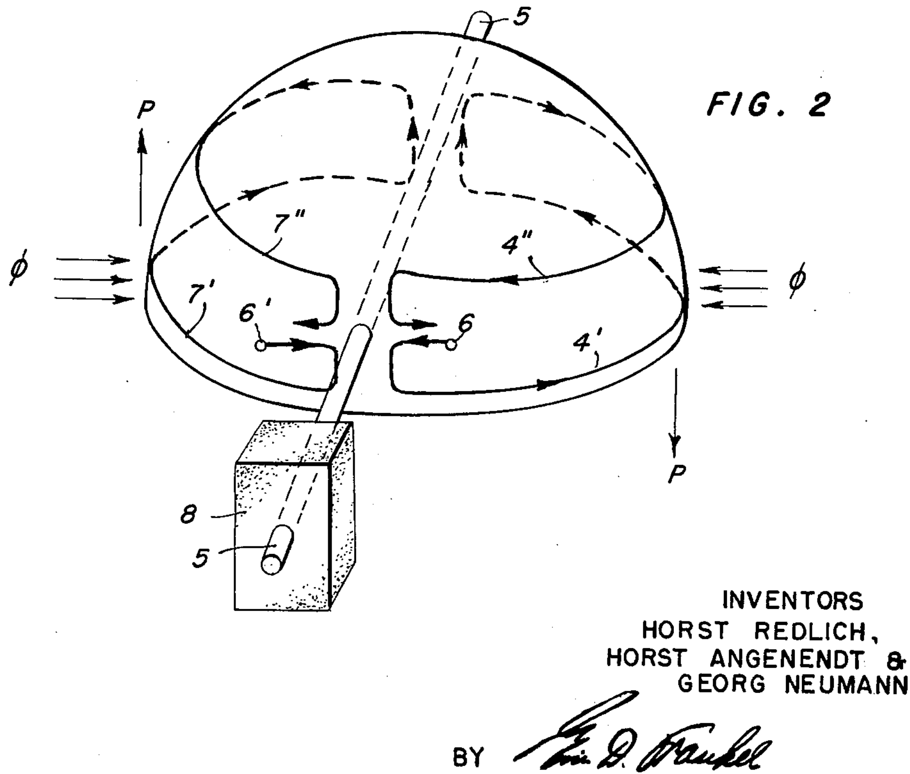
FIGURE 2 illustrates diagrammatically the operation of the transducer system according to FIGURE 1, and more specifically shows the course of the turns of the mentioned second coil and the kind of suspension.

It will now be explained with reference to FIGURE 2 which forces can be exerted on the coil body 1 by supplying a current to the coil sections 4 and 7, connected in series. The position of the shaft 5, including as part of the suspension means the resilient bearings 8, is shown in FIGURE 2. The direction of the magnetic flux $\phi$ is indicated by arrows, said flux penetrating the coils 3, 4, or 3, 7 to the extent that they are located in the annular gap. The two individual turns of the coils 4 and 7 in FIGURE 1 are denoted in FIGURE 2 by 4′ and 4″ and 7′ and 7″, respectively. It is assumed that a current flowing in the direction of the indicated arrows is fed to the turn 4′ at 6. After flowing through the turn 4′, 4″, the same current arrives at the point 6′ of the turn 7′, 7″ and flows also through the latter in the direction of the arrows, as indicated. Of the coil sections shown, only the parts 4′ and 7′ are located within the annular gap, while the return parts 4″ and 7″ are arranged in a space which is substantially outside of the magnetic field. Consequently, the resulting forces only act upon the turns 4′ and 7′. As will be seen from the position of the arrows, the instantaneous current in these parts of the coils flows away from the viewer towards the rear part of the turns. Thus, the directions of the current flow in the two parts 4′ and 7′ are opposite with respect to the axis of the annular gap. As a result of this, forces P, directed opposite one another, are exerted in these two parts, as shown by the arrows indicated in the drawing. The movements of the forces P result in a tilting of the coil body 1 about the shaft 5, so that the cutting stylus 2 in FIGURE 1 is deflected laterally in the plane of the drawing. Therefore, the signal applied to the coil parts 4 and 7 is recorded on the said matrix on a lateral track.

FIGURE 3 shows a modified form of a mechanical-electrical transducer adapted to follow a sound track having two signals to be reproduced. The pick-up needle corresponding to the cutting stylus (FIGURE 1) is denoted by 2′. 9 is a tubular resilient arm supporting a coil body 11 at the free end facing the viewer, while this arm is mounted at its other end in a bearing block 10 (FIGURE 5). The core and the outer magnetic ring of an annular gap are denoted by N′ and S′, respectively. In contrast to FIGURE 1, this annular gap in FIGURE 3 is formed by conical surfaces. The coil body 11 carries a coil 12 which may be wound in the same manner as the coil 3 in FIGURE 1 and all of the turns are wound around the coil body in the same direction. Furthermore, coil sections 13 and 14 are provided on the coil body which respectively correspond with the coil sections 4 and 7 in FIGURE 1, though, the rear connections are passed through a diametrical slot in the magnet core N′ into which a suitable protrusion of the coil body extends. Due to the provision of conical surfaces bordering the annular gap, a particular action is obtained in the sound pick-up, the angle of the conical surfaces with respect to a plane perpendicular to the axis of the annular gap being preferably about 45°.

It is assumed that the pick-up needle 2′ is guided by a sound groove which is modulated by displacements in the direction of the axis of the annular gap to furnish a signal recorded on a depth-cut track. The pick-up needle also carries out lateral displacements following a signal recorded on a lateral track. The coil body 11 follows all these displacements, said coil body having the shape of a disc with a conical rim extending into the annular gap, said rim conforming with the bordering conical surfaces of the annular gap and carrying the active coil turns. Since the coil body is very close to the pick-up needle and is suspended in such a manner that it intentionally carries out only the reciprocating displacements in the plane of symmetry of the second coil, which plane coincides with the axis of the annular gap, while practically not carrying out any rotational or tilting displacements, the described pick-up system operates with very little distortion and very little cross-talk between the two coils within the entire load range.

With reference to FIGURE 4, it will be described how the two signal voltages in the coils 12 and the series-connected coil sections 13 and 14 are induced. In FIGURE 4, the direction of the displacements corresponding to the depth-cut track is denoted by $y$, while the direction of the displacements on the lateral track is denoted by $x$. Only a single turn of the coils 12, 13 and 14 is shown, in the manner described and indicated with the symbol for the direction of the instantaneous currents. It is assumed that the individual turn 12 is affected by displacements in the direction of the $y$-axis. In this case, as shown in FIGURE 4$a$, components are cut in the $x$-direction of the magnetic field crossing the annular gap at 45° with respect to the axis of the annular gap. As a result of this, a voltage is induced in the turn 12 corresponding with the $y$-direction movements of the pick-up needle 2', said voltage having the same direction through all circumferential portions of the coil 12. The turn 12 is affected by displacements in the $x$-direction corresponding to the displacements of the pick-up needle 2'. As shown in FIGURE 4$a$, the field components in the $y$-direction will be cut during these displacements. In the two coil halves which are located on both sides of a plane perpendicular with the plane of the drawing and containing the axis of the annular gap, voltages are induced during this displacement whereby the direction of the voltages is opposite on each side of the axis of the annular gap. These voltages cancel one another so that no voltage appears at the ends of the coil 12 during displacement in the $x$-direction. Thus, the coil 12 alone is suited for the reproduction of the depth-cut track component, and it does not produce a signal voltage for lateral displacements.

The coil sections 13 and 14 are also displaced by the same displacements of the coil body 11. As shown in FIGURE 4$b$, no resulting voltage is obtained in these series-connected coil sections due to their respective winding directions being opposite one another when a displacement takes place in the $y$-direction. In this case, the field components in the $x$-direction are cut. However, these field components do not induce voltages in these two coil sections which are opposed to one another. If now the coils 13 and 14 are displaced in the $x$-direction, the field components in the $y$-direction are cut and the voltages thus induced have such direction in the two coil sections that they are added to one another. Therefore, the coil formed by the coil sections 13 and 14 is only sensitive to displacements following the lateral sound track in the groove.

FIGURE 5 shows the sound pick-up according to FIGURE 3 and a suspension means in a perspective illustration. The tubular arm 9 which is mounted in the bearing block 10 carries the pick-up needle 2' and the coil body 11 attached to the arm. The coil body 11 carries the coil 12 on a dish-shaped rim. FIGURE 6 again shows the movable part of the pick-up of FIGURE 3, but without the coil body 11 so as more clearly to illustrate the position and configuration of the coil 12 and the coil sections 13 and 14. FIGURE 6 also shows the magnet core N' and part of the outer magnetic ring S', so as to illustrate the position of the coils within the annular gap bounded by the conical surfaces of the core and ring.

FIGURE 7 shows a part of the windings on an enlarged scale, and it will be seen that the turns of the coil 12 are wound about the entire circumference of the coil body or gap, whereas the turns of the coil sections 13 and 14 extend only throughout half of this circumference, the connections between the ends of these coil sections passing through a diametric slot of the magnet core N'.

The mechanical-electrical transducers described in the foregoing can be advantageously used in arrangements of stereophonic sound recording and reproducing.

We claim:

1. A recording and pick-up transducer for cooperation with a record groove adapted to simultaneously carry two separate signals having displacement directions which are perpendicular to each other and to the tangent to the groove, said transducer comprising on a common axis extending in the first of said displacement directions annular magnet means setting up an annular air gap containing lines of flux extending radially of said axis; a body having a coil supporting skirt annular about said axis and lying in said air gap; suspension means suspending said body for deflection in either of said displacement directions; a stylus rigidly secured to the body and extending outwardly from the skirt along said axis; a first coil wound around said skirt and coaxial therewith, said first coil being associated with first displacement motion in the axial direction; and a second coil mounted on said body and having two sections wound in mutually opposite directions on mutually opposite sides of the skirt with respect to a plane containing said axis and lying normal to said second displacement direction, both of these sections having a plurality of turns, each of which includes an active portion of the turn supported on said skirt in the air gap and a non-active portion of the turn located remotely of the air gap, and the sections being connected in series opposition to form said second coil associated with the second displacement direction.

2. In a transducer as set forth in claim 1, said magnet means including a core having a slot thereacross parallel with said plane and out of said air gap, and said body having a passage through its center parallel with said slot, the active portions of the turns of said second coil sections being on the outer surface of the body and the non-active portions of the turns occupying said passage and slot.

3. In a transducer as set forth in claim 2, the two sections of the second coil as viewed along the axis of the body being wound in the form of a figure eight.

4. In a transducer as set forth in claim 1, said magnet means including a core surrounded by an annular pole, said skirt comprising a conical annular flange lying within the air gap and supporting the coils, the walls of the pole and of the core being similarly conical in the vicinity of the air gap, said suspension means being fixed to the body between the coils and the apex of said conical flange, and said stylus extending outwardly from the body on the other side of the suspension means from the coils.

5. In a transducer as set forth in claim 4, said conical flange making an angle of 45° with respect to said axis.

6. In a transducer as set forth in claim 4, said suspension means comprising a cylindrical resilient supporting arm extending in the direction of said tangent and carrying the body at one end, and rigidly supported at its other end.

7. In a transducer as set forth in claim 1, said stylus comprising a cutting stylus.

8. In a transducer as set forth in claim 1, said body comprising a hollow annular cup disposed over said core and supporting said coils on an outer surface comprising the skirt which lies within said air gap, said stylus being attached to the closed end of said cup, and said suspension means being connected to said annular portion of the cup.

9. In a transducer as set forth in claim 8, said suspension means comprising a rod passing through the cup and supported at each end in resilient bearings.

10. In a transducer as set forth in claim 1, the walls of the magnet means being cylindrical in the vicinity of the air gap.

11. In a transducer as set forth in claim 8, said cup being in the form of a hemisphere, said coils being mounted on said cup close to an equatorial plane of said hemisphere.

12. In a transducer as set forth in claim 8, said cup being in the form of an ellipsoid, said coils being mounted on said cup close to an equatorial plane of said ellipsoid.

13. In a transducer as set forth in claim 4, said stylus and said flange lying close together in the axial direction and the suspension means being rigidly fixed to the body and preventing rocking motion thereof, while at the same time permitting translatory motion in the second displacement direction.

References Cited in the file of this patent

UNITED STATES PATENTS

| | | |
|---|---|---|
| 2,105,916 | Harrison | Jan. 18, 1938 |
| 2,161,489 | Vieth et al. | June 6, 1939 |
| 2,347,347 | Yenzer | Apr. 25, 1944 |
| 2,534,725 | Miller | Dec. 19, 1950 |